Figure 1:
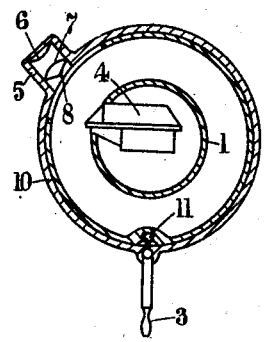

Mar. 3, 1925.

A. BARR ET AL 1,528,191

RANGE FINDER, HEIGHT FINDER, INCLINOMETER, AND THE LIKE

Filed Feb. 7, 1923

2 Sheets-Sheet 1

INVENTORS
Archibald Barr and
William Stroud
by:- Fowler and Smith,
Attorneys.

Mar. 3, 1925.  
A. BARR ET AL  
1,528,191  
RANGE FINDER, HEIGHT FINDER, INCLINOMETER, AND THE LIKE  
Filed Feb. 7, 1923  
2 Sheets-Sheet 2

INVENTORS  
Archibald Barr  
and  
William Stroud,  
by  
Fowler and Smith,  
Attorneys.

Patented Mar. 3, 1925.

1,528,191

UNITED STATES PATENT OFFICE.

ARCHIBALD BARR AND WILLIAM STROUD, OF GLASGOW, SCOTLAND, ASSIGNORS TO BARR AND STROUD, LIMITED, OF GLASGOW, SCOTLAND.

RANGE FINDER, HEIGHT FINDER, INCLINOMETER, AND THE LIKE.

Application filed February 7, 1923. Serial No. 617,651.

*To all whom it may concern:*

Be it known that we, ARCHIBALD BARR and WILLIAM STROUD, subjects of the King of Great Britain and Ireland, and both of Caxton Street, Anniesland, Glasgow, Scotland, have invented new and useful Improvements in Range Finders, Height Finders, Inclinometers, and the like, of which the following is a specification.

This invention relates to rangefinders, heightfinders, inclinometers and like optical instruments of the type, hereinafter and in the claims referred to generally as observation instruments of the coincidence type. In instruments of this type two images or partial images of the target formed in the focal plane of the eyepiece are required to occupy a definite position with reference to a separating line in the field of view.

With instruments of this type the positions of the images of the target in the field of view may be shifted by moving the instrument bodily, in azimuth or in elevation, and it is the object of this invention to make provision whereby a small auxiliary adjustment in elevation of the relative positions of the separating line and the images of the target in the field of view may readily and easily be made by the observer without moving the body of the instrument, said adjustment being a fraction of the field of view and perpendicular to the separating line.

Instruments according to this invention are generally for use under conditions where they are subject to oscillation, as in the case of range finders on board ship, or where the target is in rapid motion in two dimensions, as in the measurement of the range or height of rapidly moving aircraft, or where both of these conditions occur.

The invention, however, is particularly applicable to instruments which are directed in azimuth and elevation independently and not by the person engaged in observing the field of view in which the images of the target are seen. For example, in the case of a long naval rangefinder one observer may be employed to control the instrument in azimuth and a second observer to control the instrument in elevation, each endeavouring by moving the rangefinder bodily to keep it so directed that the images of the target lie upon the separating line of the instrument. The azimuthal control presents no difficulty as the whole length of the separating line is available for observation, so that control by this method to, say, within half or a quarter of a degree is all that is required. The control in elevation, however, generally requires to be more accurate because at long ranges it may be necessary to keep the image on the separating line to, say, within two or three minutes of arc, and by means of this invention the range-taker is enabled to make an entirely separate, independent and auxiliary small adjustment affecting the relative position in elevation of the separating line and the images of the target.

The object of this invention may be accomplished in either of two ways: (1) by moving the separating line, (2) by moving the images of the target, supposing for the moment the instrument to be stationary.

Some examples of construction according to this invention as applied to a rangefinder will now be described with reference to the accompanying drawings, in which:—

Figure 2:
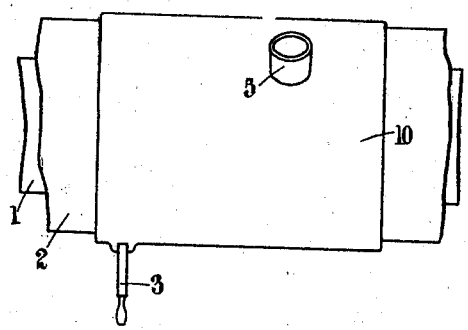
Figure 3:
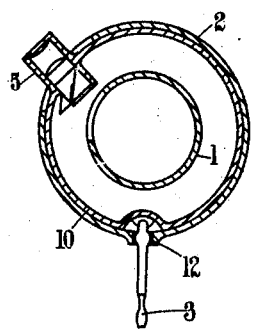
Figure 4:
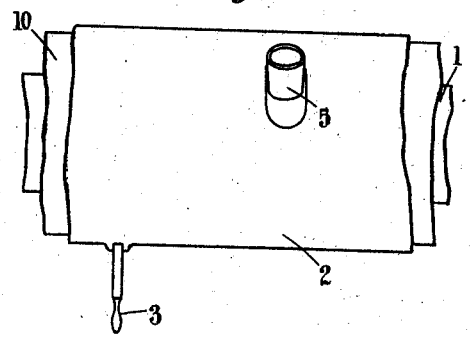
Figure 5:
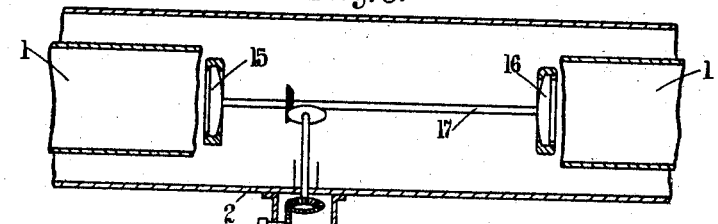
Figure 6:
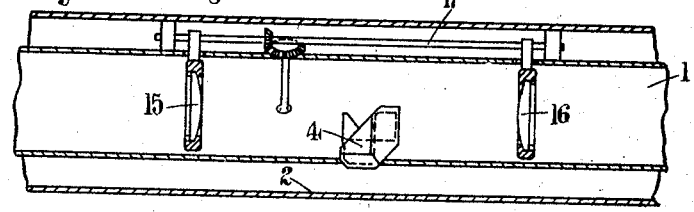
Figure 7:
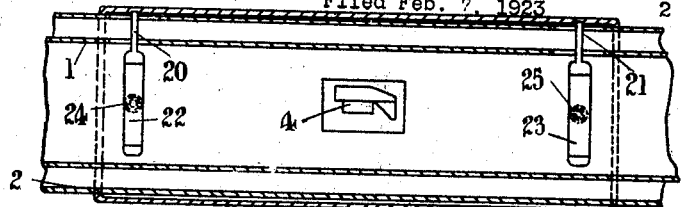
Figure 8:
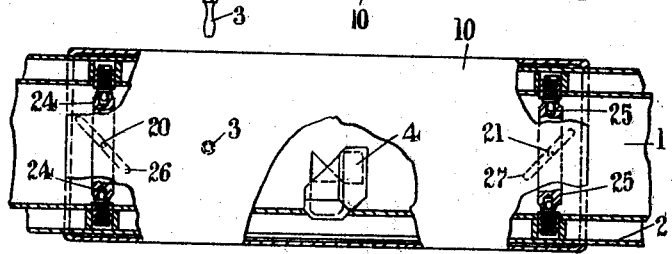
Figure 9:
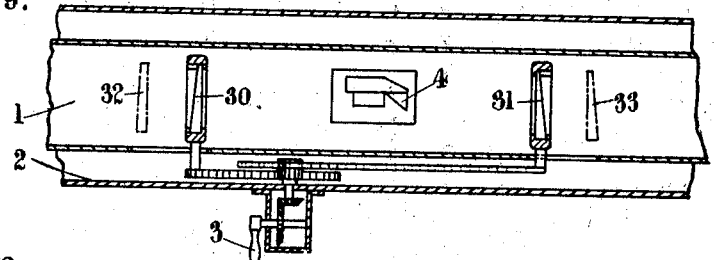
Figure 10:
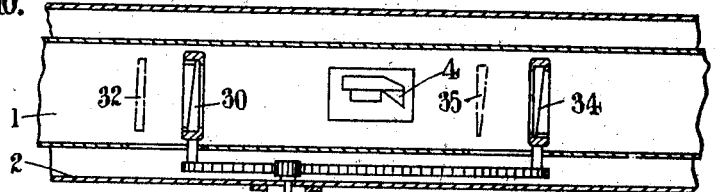
Figure 11:
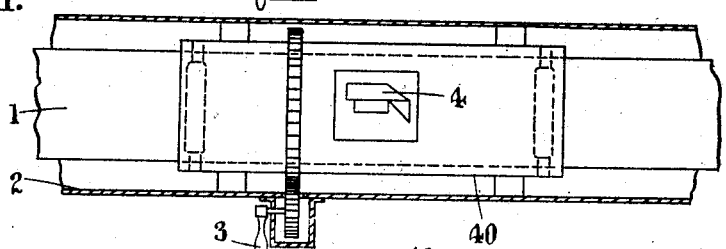
Figure 12:
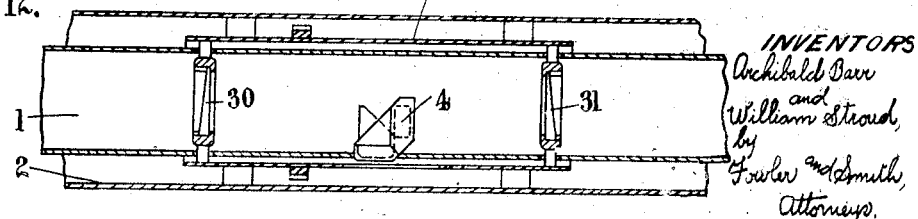

Figure 1 is a sectional elevation and Figure 2 is a side elevation illustrating one arrangement; Figures 3 and 4 are similar views illustrating another arrangement; Figures 5 and 6 are sectional elevation and plan of a third arrangement; Figures 7 and 8 are sectional elevation and plan of a fourth; Figure 9 is a sectional elevation of a fifth; Figure 10 is a sectional elevation of a sixth; and Figures 11 and 12 are sectional elevation and plan of a seventh arrangement. In all cases the main rangefinder tube is not hatched.

In the drawings 1 represents the tube or frame piece carrying the objectives and eyepiece prism system and sometimes the travelling refracting prism of the rangefinder. 2 represents the outer tube, and 3 a handle by which the auxiliary adjustment is effected, 4 the eyepiece prisms, and 5 the eyepiece, when these are shown.

In the arrangement illustrated at Figures 1 and 2, in Figure 1 of which the section taken is through the eyepiece, the eyepiece consists of an ordinary convex lens 6 and a convex lens 7 having a prism formed on its face, the edge 8 forming the separating line (a well known method of effecting a separation of the two fields). The eyepiece is fixed to a ring 10 while handle 3, pivoted to 10, has a projecting piece 11 forked with 2. When the handle is moved in the plane of the paper (Figure 1), the eyepiece carrying the separating edge 8 can be raised or lowered through a small amount.

The arrangement shown at Figures 3 and 4 is very similar to Figures 1 and 2 but instead of a separating prism we now represent another well known form of prism for separating the fields. Eyepiece prisms of special design will be required for this type of separating prism and these are not shown in the drawing. In this case handle 3 is pivoted on tube 10 carrying eyepiece 5 and the handle has a projection engaging in a slot 12 on tube 2.

Figures 5 and 6 show an arrangement in which lenses 15 and 16 fixed to rod 17 mounted on fixed bearings can be rocked up or down by handle 3 through suitable gearing represented in the drawing as bevels.

In Figures 7 and 8, 22 and 23 are two equal glass plates with parallel surfaces, mounted so as to be capable of motion about fixed bearings 24, 24 and 25, 25 respectively. The holders supporting these plates have pins 20 and 21 respectively projecting into slots 26, 27 cut in the outer sleeve 10 carrying handle 3. When the sleeve is rotated by the handle the plates 22 and 23 may be simultaneously oscillated in opposite directions.

Figure 9 shows a sectional elevation of an alternative arrangement in which equal refracting prisms 30 and 31 may be displaced by handle 3 through suitable gearing (say bevel wheels, pinion, and racks) to positions 32 and 33.

Figure 10 is similar in many respects to Figure 9 but prism 34 is oppositely disposed to prism 31 (Figure 9). Both prisms now may be fixed to the same rack so that when handle 3 is turned prisms 30 and 34 may be moved to positions 32 and 35.

Figures 11 and 12 show an arrangement in which the prisms 30 and 31 of Figure 9 are rotated instead of being translated. These prisms are fixed to a tube 40 mounted in suitable bearings carried by outer tube 2, the holders supporting the prisms being carried by arms fixed to 40 which are clear of the frame 1 supporting the main optical parts. By means of any suitable gearing tube 40 may be rotated through a small angle by handle 3.

In the case of Figures 1 and 2 and Figures 3 and 4 the separating line is made adjustable in position, whereas in the remaining figures the images of the target are moved by the devices shown.

The invention is mainly applicable to instruments working on the coincidence principle. It may, however, be advantageous in the use of stereoscopic instruments. In this latter case measuring marks will take the place of the separating line and any one of the methods already discussed or illustrated may be employed for the purpose in view.

We claim:—

1. An observation instrument of the coincidence type, having an eyepiece, a separating line formed in the focal plane of the eyepiece, an optical system for producing images of the target in the focal plane of the eyepiece, auxiliary means for producing a small relative adjustment of the separating line and the images of the target perpendicularly to the separating line operating independently of the motion of the instrument.

2. An observation instrument of the coincidence type, having an eyepiece, a separating line formed in the focal plane of the eyepiece, an optical system for producing images of the target in the focal plane of the eyepiece, the separating line being capable of small adjustment perpendicularly to itself relatively to the body of the instrument.

3. An observation instrument of the coincidence type, having an eyepiece, a separating line formed in the focal plane of the eyepiece, an optical system for producing images of the target in the focal plane of the eyepiece, the separating line being capable of small adjustment perpendicularly to itself in elevation relative to the images in the focal plane of the eyepiece, for the purposes set forth.

4. An observation instrument of the coincidence type, having an eyepiece, a separating line formed in the focal plane of the eyepiece, an optical system for producing images of the target in the focal plane of the eyepiece, auxiliary means capable of producing small relative adjustment of the separating line and the images of the target operating independently of the motion of the instrument, and a handle mounted to rock about an axis parallel with the axis of elevation for operating the auxiliary means for the purpose set forth.

5. An observation instrument of the coincidence type, having an eyepiece mounted capable of angular adjustment relative to the body of the instrument, a separating line formed in the focal plane of the eyepiece and movable therewith, an optical system for producing images of the target in the focal plane of the eyepiece, and means for angularly adjusting the eyepiece of the instrument.

ARCHIBALD BARR.
WILLIAM STROUD.